(12) United States Patent
Fletcher

(10) Patent No.: US 10,145,090 B2
(45) Date of Patent: Dec. 4, 2018

(54) AUTOMATED DRIP FLOW VALVE FOR FREEZE PROTECTION

(71) Applicant: International Business Machines Corporation, Armonk, NY (US)

(72) Inventor: James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/232,166

(22) Filed: Aug. 9, 2016

(65) Prior Publication Data

US 2018/0044896 A1 Feb. 15, 2018

(51) Int. Cl.
*E03B 7/12* (2006.01)
*E03B 7/07* (2006.01)
*G05D 7/06* (2006.01)

(52) U.S. Cl.
CPC ............... *E03B 7/12* (2013.01); *E03B 7/071* (2013.01); *G05D 7/0635* (2013.01); *Y10T 137/1353* (2015.04)

(58) Field of Classification Search
CPC F16K 31/02; E03B 7/12; E03B 7/071; G05D 7/0635; Y10T 137/1189; Y10T 137/1353; G05B 15/02
USPC ....................................... 251/129.04; 137/62
See application file for complete search history.

(56) References Cited

U.S. PATENT DOCUMENTS

| | | | |
|---|---|---|---|
| 6,337,635 B1 * | 1/2002 | Ericksen et al. | A01G 25/165 137/624.11 |
| 8,276,877 B2 * | 10/2012 | Cha et al. | F16K 37/0025 251/129.04 |
| 8,402,984 B1 | 3/2013 | Ziegenbein et al. | |
| 8,424,550 B2 * | 4/2013 | Lips | A01G 25/00 137/1 |
| 8,739,830 B2 * | 6/2014 | Bradbury et al. | A01G 25/16 137/236.1 |
| 9,049,821 B1 | 6/2015 | Hanna | |
| 9,290,273 B1 | 3/2016 | Thompson et al. | |
| 2006/0112989 A1 * | 6/2006 | Rode et al. | E03B 7/10 137/62 |
| 2009/0235992 A1 | 9/2009 | Armstrong | |

(Continued)

OTHER PUBLICATIONS

Prindle, Drew: Lowe's new Smart Valve prevents pipe bursts: "Leaving Town? This Box Won't Just Detect a Burst Pipe, it Will Stop it Automatically"; Digital Trends; Nov. 25, 2014; 5 pp.

(Continued)

*Primary Examiner* — Kevin Lee
(74) *Attorney, Agent, or Firm* — Mollborn Patents, Inc.; Fredrik Mollborn

(57) ABSTRACT

Methods and apparatus, including computer program products, implementing and using techniques for regulating water flow in a pipe. A water flow regulator includes a valve configured to regulate water flow, a power source, a communication module and a processor. The communication module is configured to receive instructions pertaining to water flow regulation over a wireless network and to send instructions to the processor. The instructions are based at least in part on weather data and on the physical location of the water flow regulator. The processor is coupled to the communication module, and is configured to send a control signal to the valve to regulate the water flow in accordance with a received instruction from the communication module.

14 Claims, 1 Drawing Sheet

(56) References Cited

U.S. PATENT DOCUMENTS

| | | |
|---|---|---|
| 2013/0025709 A1 | 1/2013 | Mann et al. |
| 2014/0034145 A1 | 2/2014 | Burt |
| 2015/0075638 A1 | 3/2015 | Park |
| 2016/0024759 A1 | 1/2016 | Vinjamaram |
| 2016/0179104 A1* | 6/2016 | Cregg .................... G05B 15/02 700/282 |

OTHER PUBLICATIONS

Wireless Z-Wave Water Valve—1¼inch; Z-Wave Products; Copyrights © 2006-2016 Z-Wave Products Inc.; 11 pp.

Zilker: Intelligent irrigation, without a sprinkler system; <https://www.kickstarter.com/projects/zilker/zilker-intelligent-irrigation-without-a-sprinkler; Copyright © 2016 Austin Devices, LLC. 4 pp.

* cited by examiner

AUTOMATED DRIP FLOW VALVE FOR FREEZE PROTECTION

BACKGROUND

The present invention relates to pipes and water faucets, and more specifically, to prevention of freezing of water pipes and faucets at low temperatures.

When temperatures drop below freezing, many homes, apartments, etc., are not built to prevent freezing of pipes and the resultant damage. In order to reduce the risk of freezing pipes and faucets, a common practice is to turn a faucet to a slow drip. This manual process requires a human to be present, to recognize the potential problem, to take action by turning on the faucet to drip, and to remember to turn the faucet off when the risk of freezing is over. Often this may either result in longer than necessary flow of water, which can be costly, or a lack of action which results in water damage, frozen pipes, and subsequent insurance claims

SUMMARY

According to one embodiment of the present invention, methods, systems and computer program products are provided for minimizing the risks of water pipes and faucets freezing during cold temperatures. The water flow regulator includes a valve configured to regulate water flow, a power source, a communication module and a processor. The communication module is configured to receive instructions pertaining to water flow regulation over a wireless network and to send instructions to the processor. The instructions are based at least in part on weather data and on the physical location of the water flow regulator. The processor is coupled to the communication module, and is configured to send a control signal to the valve to regulate the water flow in accordance with a received instruction from the communication module.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for minimizing the risks of water pipes and faucets freezing during cold temperatures.

In one embodiment, an aftermarket IOT-enabled (Internet Of Things) device (hereinafter referred to as a "water flow regulator") is provided that connects to the water input system, for example, of a house, apartment or office building, and empties into the drain system of the building. The water flow regulator can be provided either as a component of a faucet, or as an after market add-on to an existing faucet.

The water flow regulator is activated by weather information pertaining to current and expected temperatures. Based on this information, the water flow regulator can automatically control whether the faucet should be turned on to a slow drip. The timing and duration of the dripping can be automated to minimize the dripping time and thereby reduce wasted consumption of water. As a result, water consumption can be minimized while at the same time avoiding damage to pipes and faucets due to freezing.

Figure 1:
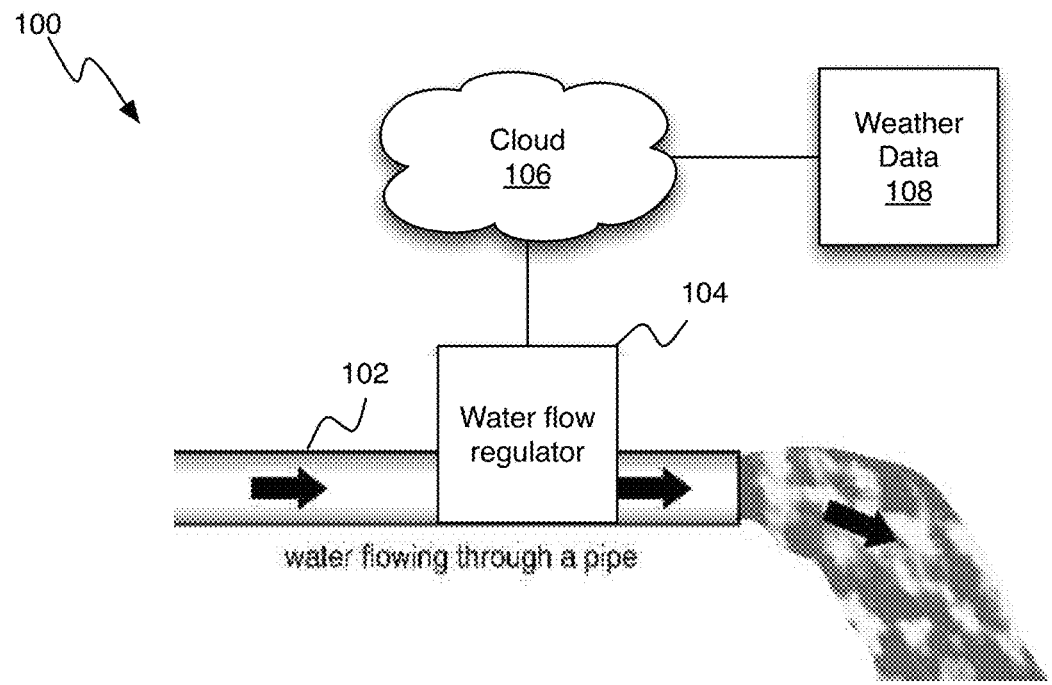
FIG. 1 shows a schematic view of a system 100 for regulating water flow through a pipe, based on weather data, in accordance with one embodiment.

With reference now to FIG. 1, a schematic system 100 for water flow regulation is shown in accordance with one embodiment of the invention. As can be seen in FIG. 1, the system 100 includes a water pipe 102, through which water flows. A water flow regulator 104 is attached to the pipe and can regulate the water flow through the spigot, as will be described in further detail below. The water flow regulator 104 can either be built into the faucet itself, or be installed as an add-on device to an already existing faucet and water pipe, using techniques that are familiar to those having ordinary skill in the art. The water flow regulator 104 is connected to a cloud-computing environment 106, through which the water flow regulator can obtain weather data 108 about current and/or predicted temperatures, for example, from a local weather station or some kind of data store.

Figure 2:
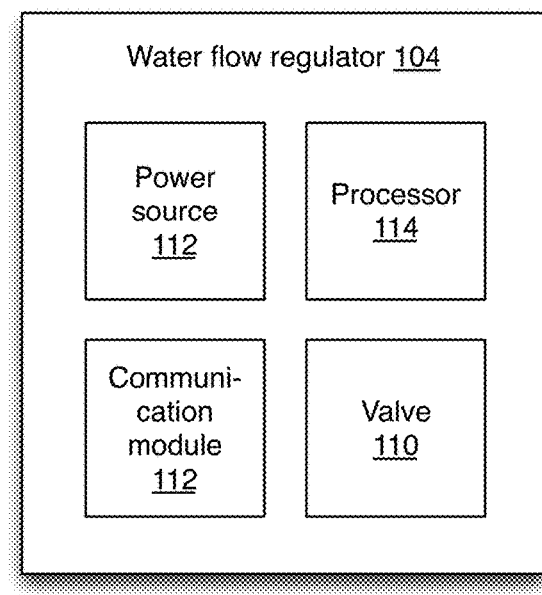
FIG. 2 shows a schematic, more detailed view of a water flow regulator 104, in accordance with one embodiment.

FIG. 2 shows a more detailed view of a water flow regulator 104 in accordance with one embodiment. As can be seen in FIG. 2, the water flow regulator includes a valve 110, a power source 112, a communication module 114, and a processor 116.

The valve 110 is configured to regulate the water flow through the pipe, similar to how conventional electro-mechanical valves work. In one embodiment, the valve 110 can be opened to different degrees, ranging from fully open, to a trickle, to a slow drip, or informed to close based on specific needs. The valve 110 is configured to respond to specific instructions given by the processor 116, as will be described in further detail below.

The power source 112 can be any type of conventional power source that is sufficient to power the valve 110, communication module 114 and processor 116. For example, in some embodiments batteries may be used and in others, the water flow regulator 104 may be hooked up into the electrical system of the building through a power cord. In such an embodiment, there may also be an additional battery pack to serve as backup, for example, during a power outage. Given the criticality of the power source, a backup system and notification of failure are critical to assure effective operations of the system.

The communication module 114 is configured to communicate through either a wired network or a wireless network, or a combination thereof, with computers in a cloud-computing environment 106 to receive data that can be used by the processor 116 to open or close the valve 110. The communication module 114 can use a wide range of well-known communication protocols to obtain this data, such as Bluetooth, Wi-Fi, or various types of home automation protocols, like Zwave® or Zigbee®, for example.

The signals for turning on or turning off the valve 110 are obtained by the communication module from the cloud-computing environment 106, for example, via a web service. The signals can be driven by logic within the cloud 106 that receives weather data 108, monitors the temperature predictions for the location of the water flow regulator 104, and provides an appropriate signal based on current and/or expected temperatures. The location of the water flow regulator 104 can be provided to the cloud-computing environment 106, for example, by the user through a web interface.

Alternatively, in some embodiments, the water flow regulator 104 can be optionally equipped with a Global Positioning Device (GPS), allowing its location to be automatically communicated to the cloud-computing environment 106.

As the skilled person realizes, weather data is merely one example of data that can be used to control the water flow. In some embodiments, a user can use the web interface to manually set times and/or flow rates, so that if a user is away from home for an extended period of time during a summer vacation, for example, the water cannot be turned on during this time.

The processor 116 is coupled to the communication module 114, and receives instructions from the communication module 114 as to when to open or close the valve and to what degree. The processor 116 then sends the appropriate signals to the valve 110 to effect the water regulation. In some embodiments, the processor 116 and communication module 114 could be a specialized standalone device. In other embodiments, they could be embedded into a broader functioning device like a home gateway.

It should be noted that while the various embodiments of the invention have been described above as having all computing power and logic in the cloud and merely sending open/close signals to the water flow regulator 104, there may also be embodiments in which the water flow regulator 104 itself has the ability to determine when to open or close the valve 110. For example, the communication module 114 may only receive data about expected temperatures, and then the water flow regulator 104 may contain logic that allows the processor 116 to determine by itself whether to open or close the valve 110. There may also be embodiments in which the communication module 114 communicates directly, for example, via Bluetooth or a similar protocol, with an outdoor thermometer located at the premises of the water flow regulator 104 and the processor then controls the water flow based on the instant readings by the outdoor thermometer. In some embodiments, the water flow regulator 104 may have a built-in thermometer that is used to determine when to open or close the valve.

Further, it should be noted that while the above description has been primarily focused on when to turn on the faucet, it is equally as important to turn the faucet off when the freezing (or other) condition passes. Logic for affecting this can be easily envisioned by those having ordinary skill in the art, based on the above description. There may also be situations during which the faucet should not be turned on, despite there being freezing conditions, for example, when the threat of freezing is only during a very small window of time. Many such design features can be realized by the skilled artisans.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A water flow regulator, comprising:
   a valve configured to regulate water flow in a faucet connected to a water input system for a building and emptying into a drain system of the building;
   a power source;
   a communication module configured to receive instructions pertaining to water flow regulation in the faucet over a wireless network and to send instructions to a processor, wherein the instructions are based at least in part on weather data and on a geographical location of the water flow regulator; and
   a processor coupled to the communication module, the processor being configured to send a control signal to the valve to regulate the water flow in the faucet in accordance with a received instruction from the communication module, wherein regulating the water flow includes initiating a water flow through the faucet in response to detecting a possible freezing condition for at least part of the water input system, and terminating the water flow through the faucet in response to detecting that the possible freezing condition is no longer present.

2. The water flow regulator of claim 1, wherein the water flow regulator is configured to be installed as an add-on component to the faucet.

3. The water flow regulator of claim 1, wherein the water flow regulator is a component of the faucet.

4. The water flow regulator of claim 1, wherein the instructions based on the weather data include instructions based on one or more of: a measured current temperature and an expected future temperature at the geographical location of the water flow regulator.

5. The water flow regulator of claim 1, wherein the valve is an electromechanical valve that is configured to allow varying degrees of water flow.

6. The water flow regulator of claim 1, wherein the power source is a battery package.

7. The water flow regulator of claim 1, wherein the communication module is configured to use one or more of the following communication protocols: Bluetooth, Wi-Fi, Zigbee and Zwave.

8. A method for regulating water flow in a faucet, comprising:
   receiving, by a water flow regulator, instructions pertaining to water flow regulation in the faucet over a wireless network, wherein the faucet is connected to a water input system for a building and emptying into a drain system of the building, and wherein the instructions are based at least in part on weather data and on a geographical location of a water flow regulator; and
   sending a control signal to a valve to regulate the water flow in the pipe in accordance with the received instructions, wherein regulating the water flow includes initiating a water flow through the faucet in response to detecting a possible freezing condition for at least part of the water input system, and terminating the water flow through the faucet in response to detecting that the possible freezing condition is no longer present.

9. The method of claim 8, wherein the instructions based on the weather data include instructions based on one or more of: a measured current temperature and an expected future temperature at the geographical location of the water flow regulator.

10. The method of claim 8, wherein the valve is an electromechanical valve that is configured to allow varying degrees of water flow.

11. The method of claim 8, wherein the wireless network uses one or more of the following communication protocols: Bluetooth, Wi-Fi, Zigbee and Zwave.

12. A computer program product for regulating water flow in a faucet, the computer program product comprising a computer readable storage medium having program instructions embodied therewith, the program instructions being executable by a processor in a water flow regulator to cause a water flow regulator to:

receive instructions pertaining to water flow regulation in the faucet over a wireless network, wherein the faucet is connected to a water input system for a building and emptying into a drain system of the building, and wherein the instructions are based at least in part on weather data and on a geographical location of a water flow regulator; and send a control signal to a valve to regulate the water flow in the pipe in accordance with the received instructions, wherein regulating the water flow includes initiating a water flow through the faucet in response to detecting a possible freezing condition for at least part of the water input system, and terminating the water flow through the faucet in response to detecting that the possible freezing condition is no longer present.

13. The computer program product of claim 12, wherein the instructions based on the weather data include instructions based on one or more of: a measured current temperature and an expected future temperature at the geographical location of the water flow regulator.

14. The computer program product of claim 12, wherein the wireless network uses one or more of the following communication protocols: Bluetooth, Wi-Fi, Zigbee and Zwave.

* * * * *